US010129502B2

(12) United States Patent
Ansari et al.

(10) Patent No.: US 10,129,502 B2
(45) Date of Patent: Nov. 13, 2018

(54) METHOD AND DEVICE FOR AUTHORIZING VIDEO CONTENTS DURING VIDEO CALL

(71) Applicant: SAMSUNG ELECTRONICS CO., LTD., Suwon-si (KR)

(72) Inventors: Sariya Ansari, Noida (IN); Tanweer Alam, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/309,107

(22) Filed: Jun. 19, 2014

(65) Prior Publication Data
US 2015/0003608 A1   Jan. 1, 2015

(30) Foreign Application Priority Data

Jul. 1, 2013    (IN) ............................. 2898/CHE/2013
Nov. 18, 2013   (KR) ......................... 10-2013-0140084

(51) Int. Cl.
| *H04N 7/14* | (2006.01) |
| *G09C 5/00* | (2006.01) |
| *H04L 9/32* | (2006.01) |

(52) U.S. Cl.
CPC .............. *H04N 7/147* (2013.01); *G09C 5/00* (2013.01); *H04L 9/3226* (2013.01); *H04L 2209/608* (2013.01)

(58) Field of Classification Search
CPC . H04L 9/0863; H04L 2209/608; H04N 7/147; H04N 21/23892; H04N 21/8358
See application file for complete search history.

(56) References Cited

U.S. PATENT DOCUMENTS

| 7,162,076 | B2 | 1/2007 | Liu | |
| 7,185,200 | B1 | 2/2007 | Levine et al. | |
| 7,450,147 | B2 * | 11/2008 | Whited | .................... H04N 5/76 348/14.01 |
| 7,734,952 | B1 * | 6/2010 | Hoffman | ............. G06F 11/2025 714/10 |
| 8,306,776 | B2 | 11/2012 | Ihara et al. | |

(Continued)

FOREIGN PATENT DOCUMENTS

| CN | 101784864 A | | 7/2010 |
| WO | WO01/61508 | * | 8/2001 |
| WO | WO 01/61508 | * | 8/2001 |

OTHER PUBLICATIONS

Communication dated Sep. 18, 2014 issued by the International Searching Authority in counterpart International Patent Application No. PCT/KR2014/005017.

(Continued)

*Primary Examiner* — Carl G Colin
*Assistant Examiner* — Vance M Little
(74) *Attorney, Agent, or Firm* — Sughrue Mion, PLLC

(57) ABSTRACT

A method of authorizing video contents during a video call initiated by a first device to a second device, includes capturing the video contents of the video call, generating a watermark payload from information about at least one of the first device and the second device, applying the watermark payload to the video contents, and transmitting the watermarked video contents to at least one of the first device and the second device.

16 Claims, 16 Drawing Sheets

(56) References Cited

U.S. PATENT DOCUMENTS

| | | | | |
|---|---|---|---|---|
| 2001/0001613 | A1* | 5/2001 | Hashimoto | G06T 1/0035 375/240.18 |
| 2002/0090114 | A1* | 7/2002 | Rhoads | G06F 17/30876 382/100 |
| 2005/0146599 | A1 | 7/2005 | Whited et al. | |
| 2005/0193205 | A1 | 9/2005 | Jacobs et al. | |
| 2006/0018507 | A1* | 1/2006 | Rodriguez | G06T 1/0064 382/100 |
| 2006/0031684 | A1* | 2/2006 | Sharma et al. | 713/186 |
| 2006/0126890 | A1* | 6/2006 | Shi | G06T 1/0028 382/100 |
| 2006/0133644 | A1 | 6/2006 | Wells et al. | |
| 2006/0133645 | A1* | 6/2006 | Rhoads | G06F 17/30876 382/100 |
| 2006/0143481 | A1 | 6/2006 | Morten | |
| 2006/0269096 | A1* | 11/2006 | Kumar | G06T 1/0057 382/100 |
| 2007/0270145 | A1* | 11/2007 | Feng | H04W 36/18 455/436 |
| 2009/0154707 | A1 | 6/2009 | Lee et al. | |
| 2010/0128921 | A1* | 5/2010 | Alattar | G06T 1/0064 382/100 |
| 2011/0261998 | A1 | 10/2011 | Roberts et al. | |
| 2012/0268553 | A1* | 10/2012 | Talukder | H04L 12/1818 348/14.08 |
| 2013/0027506 | A1 | 1/2013 | Cutler | |
| 2013/0067042 | A1 | 3/2013 | Menezes et al. | |
| 2013/0111213 | A1* | 5/2013 | Chen | G06F 21/10 713/176 |
| 2014/0009560 | A1* | 1/2014 | Krishnan | H04M 3/436 348/14.03 |

OTHER PUBLICATIONS

Tzouveli, et al., "Automatic Face Region Watermarking Using Qualified Significant Wavelet Trees", In Proceedings of 9th International Workshop on Systems, Signal and Image Processing,Control Systems Centre (IWSSIP 2002), Manchester, UK, Nov. 2002, total 6 pages.

Communication dated Dec. 28, 2017, issued by the Chinese Patent Office in counterpart Chinese Application No. 201480037973.0.

* cited by examiner

METHOD AND DEVICE FOR AUTHORIZING VIDEO CONTENTS DURING VIDEO CALL

CROSS-REFERENCE TO RELATED APPLICATIONS

This application claims priority from Indian Patent Application No. 2898/CHE/2013, filed on Jul. 1, 2013 in the Indian Intellectual Property Office, and from Korean Patent Application No. 10-2013-0140084, filed on Nov. 18, 2013 in the Korean Intellectual Property Office, the disclosures of which are incorporated herein in their entireties by reference.

BACKGROUND

1. Field

Apparatuses and methods consistent with exemplary embodiments relate to authorizing video contents, and more particularly, to watermarking video contents to protect privacy and security during a video call.

2. Description of the Related Art

As demand for use of digital video streaming in many real-time video applications increases, there is demand for video authorization to protect privacy. There is a variety of methods for guaranteeing genuineness of video streams.

One of the methods is to distribute a group key for a video conference by using a one-time password. According to this method, a group key is created, encrypted, and transmitted to a client device. The encrypted group key transmitted to the client device may be decrypted by using the created one-time password. An acknowledgement message is created by using the decrypted group key and transmitted back to a server in order to participate in the video conference. This method is user-friendly and guarantees a high level of security. However, once video contents are rendered by one party, it is difficult to prevent illegal use of the video contents.

Digital watermarking is a technology for tracking a source by which illegal use of video data may be found and an illegal user may be tracked. According to a watermarking method of the related art, when a client device requests video contents, a contents server adds a watermark in a part of the video contents before streaming the contents to the client device. However, in a video conference application, privacy and security for identity are the main concerns. I.e., a party may take a snapshot or record a video call without authorization of an initiator of the video call. There is demand for a system to protect personal privacy by preventing recording, storing, or distributing conference contents without authorization of a call initiator, etc. Also, there is demand for detecting a watermark so as to track an illegal user.

Furthermore, even though a device performance and a network platform are variable, an appropriate watermark method is passively selected, thus making such methods inefficient. Accordingly, the watermark method of the related art consumes a great amount of processing time and, thus, video quality may be deteriorated.

SUMMARY

Exemplary embodiments may address at least the above problems and/or disadvantages and other disadvantages not described above. The exemplary embodiments are not required to overcome the disadvantages described above, and may not overcome any of the problems described above.

One or more exemplary embodiments provide a method and device for embedding a watermark in real time when a video call is initiated by a device. The method and device automatically check processing performance of a device on communication and a usable network bandwidth to determine whether watermarking is initiated at a device side or a server side. The method and device based on the processing performance and the network bandwidth selects the most efficient watermarking method, thereby authorizing a video call.

According to an aspect of an exemplary embodiment, there is provided a method of authorizing video contents during a video call at a first device, in which the video call is initiated by the first device to a second device via a network, the method including: capturing the video contents of the video call, generating a watermark payload from information about at least one of the first device and the second device, applying the watermark payload to the video contents, and transmitting the watermarked video contents to the second device.

According to an aspect of another exemplary embodiment, there is provided a method of authorizing video contents during a video call at a second device, the method including: capturing the video contents of the video call initiated by a first device via a network, generating a watermark payload from information about at least one of the first device and the second device, applying the watermark payload to the video contents, and transmitting the watermarked video contents to the first device.

According to an aspect of another exemplary embodiment, there is provided a method of authorizing video contents of a video call at a service providing computer, the method including capturing the video contents of the video call initiated by a first device to a second device via a network, generating a watermark payload from information about at least one of the first device and the second device, applying the watermark payload to the video contents, and transmitting the watermarked video contents to the second device.

According to an aspect of another exemplary embodiment, there is provided a method of authorizing video contents at a second device, the method including receiving the video contents of a video call initiated by a first device via a network, and detecting a watermark payload from the video contents.

According to an aspect of another exemplary embodiment, there is provided a first device for authorizing video contents during a video call, the first device a camera for capturing the video contents of the video call initiated to a second device via a network, a watermark generator for generating a watermark payload from device information about at least one of the first and second devices, a processor for applying the watermark payload to the video contents, and a transmitter for transmitting the watermarked video contents to the second device.

According to an aspect of another exemplary embodiment, there is provided a second device for authorizing video contents during a video call, the second device including a camera for capturing the video contents of the video call initiated by a first device via a network, a watermark generator for generating a watermark payload from device information about at least one of the first and second devices, a processor for applying the watermark payload to the video contents, and a transmitter for transmitting the watermarked video contents to the first device.

According to an aspect of another exemplary embodiment, there is provided a service providing computer for authorizing video contents during a video call, the service providing computer including a video contents receiver for receiving the video contents of the video call, the video call being initiated by a first device to a second device via a network, an authorization processor for generating a watermark payload from device information about at least one of the first and second devices, and applying a generated watermark payload to the video contents, and a video contents transmitter for transmitting the watermarked video contents to the second device.

According to an aspect of another exemplary embodiment, there is provided a second device for authorizing video contents of a video call, the second device including a communicator receiving the video contents of the video call, the video call being initiated by the first device to the second device via a network, and a watermark detector detecting a watermark payload from the video contents.

BRIEF DESCRIPTION OF THE DRAWINGS

The above and/or other aspects will become more apparent by describing certain exemplary embodiments with reference to the accompanying drawings, in which.

DETAILED DESCRIPTION

Figure 1:
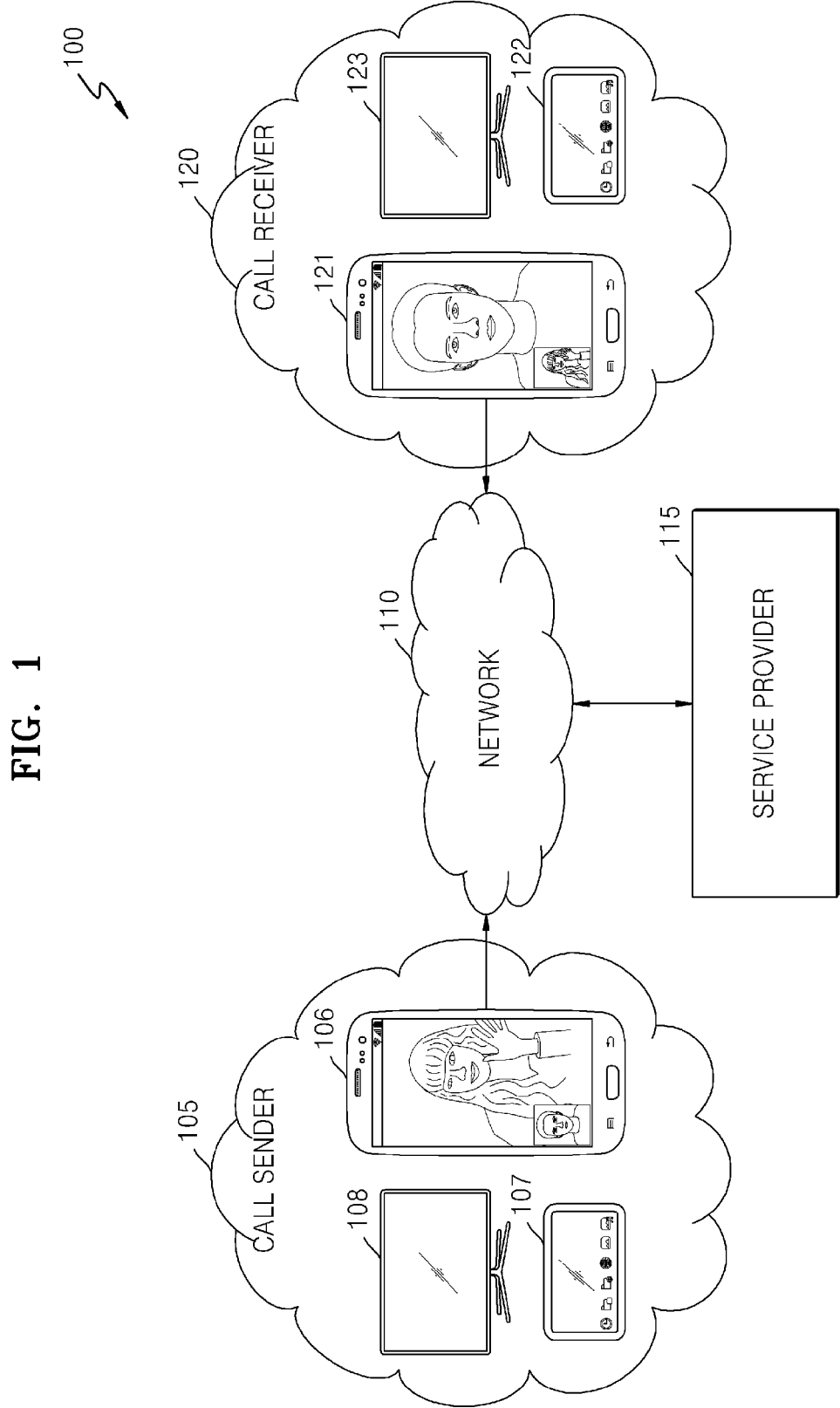
FIG. 1 is a block diagram illustrating an environment for embodying an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

A method and device for authorizing a video call by watermarking video contents in real time during the video call is described below. Watermarking is used to protect video contents from forgery. A watermark embedded in a video may be detected and thus an illegal user of the video may be tracked.

In the description, terms such as "first" and "second" may be used to distinguish one entity from another entity without indicating the actual relationship or order of the entities.

FIG. 1 is a block diagram illustrating an environment 100 for embodying an exemplary embodiment. In FIG. 1, the environment 100 includes a call sender 105, a network 110, a service provider 115, and a call receiver 120. In the following description, the call sender 105 is referred to as a first device or a call sending device that initiates a video call to the call receiver 120, and the call receiver 120 is referred to as a second device or a call receiving device that receives a video call from the call sender 105. Examples of devices that are referred to as the call sender 105 or the call receiver 120 may be a mobile phone 106 or 121, a tablet device 107 or 122, and a television (TV) 108 or 123, respectively, but an exemplary embodiment is not limited thereto. Other devices that are not illustrated in FIG. 1, for example, personal digital assistants (PDAs), smart phones, laptop computers, etc., that are capable of communicating via a network, may be used as the above-described devices. The call sender 105 communicates with the call receiver 120 via the network 110. When the call sender 105 and the call receiver 120 are mobile devices, the network 110 includes a mobile network. The mobile network is a high-speed mobile network supporting audio and video calls. An example of the mobile network includes a universal mobile telecommunication system (UMTS) and other high-speed data networks, but an exemplary embodiment is not limited thereto. The network 110 may include one or more service providers, for example, the service provider 115.

When the first device 105 initiates a video call to the second device 120, video of a video call is captured and processed to embed a watermark. In an example, to watermark the video of a video call, the first device 105 identifies at least one of processing performance of the first and second devices 105 and 120 and a network bandwidth of the network 110. The watermark is embedded based on the identified processing performance and network bandwidth. It is determined according to the identified processing performance and network bandwidth whether to allow watermark embedding to be performed at the first device 105, the second device 120, or the service provider 115.

Figure 2:
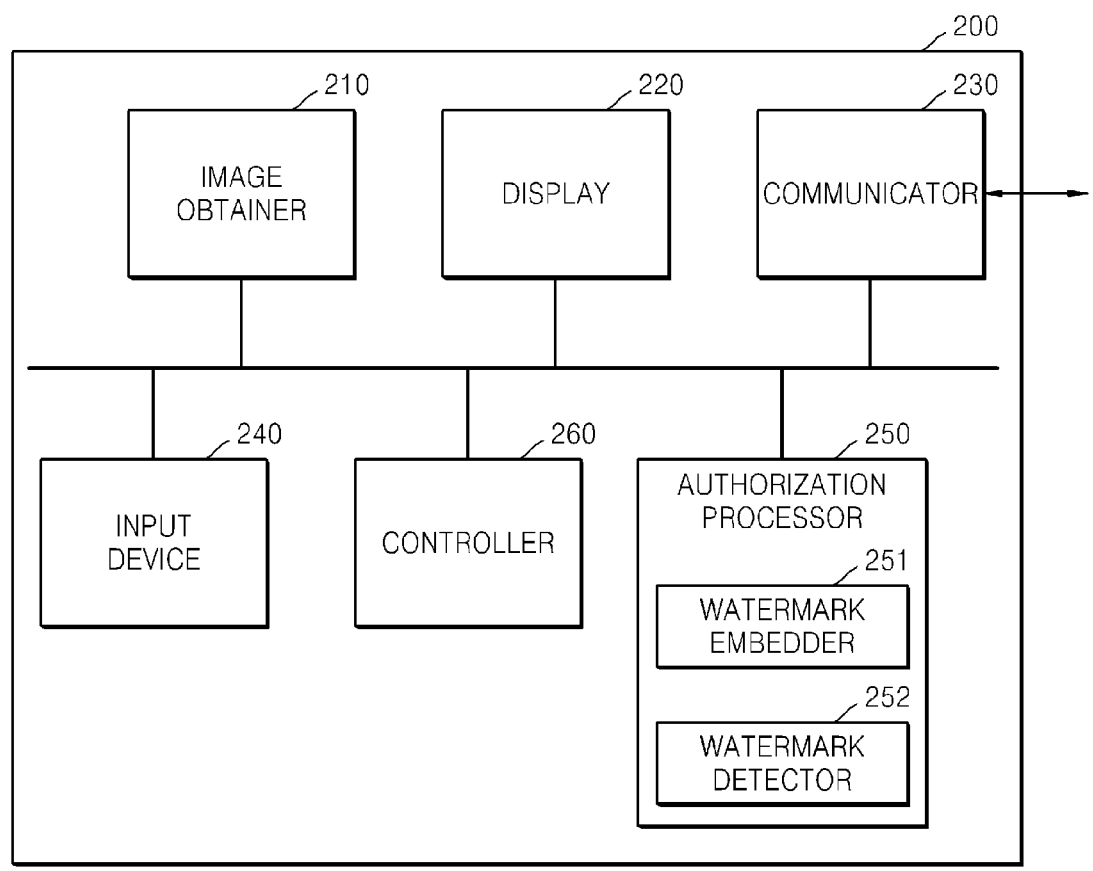
FIG. 2 is a block diagram of a device for watermarking image call video, according to an exemplary embodiment.

FIG. 2 is a block diagram of a device 200 for watermarking image call video, according to an exemplary embodiment. Referring to FIG. 2, the device 200 includes an image obtainer 210, a display 220, a communicator 230, an input device 240, an authorization processor 250, and a controller 260. The device 200 may be embodied in at least one of the first device 105, the second device 120, and the service provider 115, or may be separately provided as a third party watermark providing entity (not illustrated).

The image obtainer 210 captures the video of a video call in real time when a video call is initiated by the first device 105 to the second device 120. The image obtainer 210 includes a camera, a scanner, etc. A captured image is input to the authorization processor 250.

The display 220 outputs data processed by the device 200 to show the data to a user. The communicator 230 transmits the data processed by the device 200 to an external device via the network 110 or receives data from the external device via the network 110. According to an exemplary embodiment, the video of a video call, watermarked video of a video call, analysis information of video of a video call, etc. are transmitted to the outside through the communicator 230 and also the video of a video call and the watermarked video of a video call may be received from a counterparty's device of a video call.

The input device 240 receives data from a user. The authorization processor 250 is configured to process authorization of video contents of a video call according to an exemplary embodiment. The authorization processor 250 includes a watermark embedder 251 for embedding a watermark in the video contents of a video call and a watermark detector 252 for detecting the watermark from the video contents received during the video call. The controller 260 controls the above-described elements of the device 200.

Figure 3:
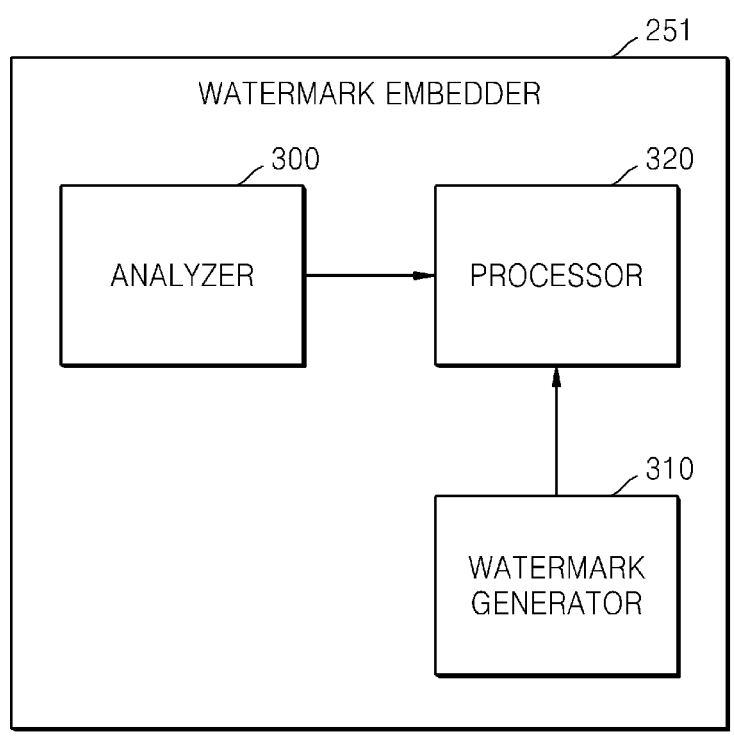
FIG. 3 is a detailed block diagram of a portion of FIG. 2.

FIG. 3 is a detailed block diagram of the watermark embedder 251 included in the authorization processor 250 of FIG. 2. Referring to FIG. 3, the watermark embedder 251 includes an analyzer 300, a watermark generator 310, and a processor 320.

The analyzer 300 receives and analyzes video contents of a video call captured during a video call. In detail, the analyzer 300 receives and analyzes network environment information and device environment information of the first device, i.e., a call sending device, and the second device, i.e., a call receiving device, that are entities or parties of the video call, and provides a result of the analyzing to the processor 320.

The watermark generator 310 generates a watermark to be embedded in the video contents and provides a generated watermark to the processor 320. The watermark generator 310 may use information about a device and a network, that is, unique identification details, to generate a watermark payload to be embedded in the video contents. The unique identification details may include at least one of the International Mobile Station Equipment Identity (IMEI) number, a phone number, and channel 50 data, but are not limited thereto. The channel 50 data includes local information of a mobile device. Channel 50 is one of the channels which are used for Cell Broadcast (CB) to tell handsets about the cell they are currently connected with. Cell BroadCast is a part of GSM standard, and different data/messages are broadcast to a subscriber on different channels. "Channel 50" is used by Operators to broadcast Cell Information. So if a subscriber is in the region of, for example, "Cell A" and it has enabled to receive CB messages then it would be able to identify its current cell location.

The processor 320 receives the analysis result from the analyzer 300 and the watermark from the watermark generator 310. According to the analysis result, the processor 320 encodes the video contents so that the watermark is embedded in the video contents.

Figure 4:
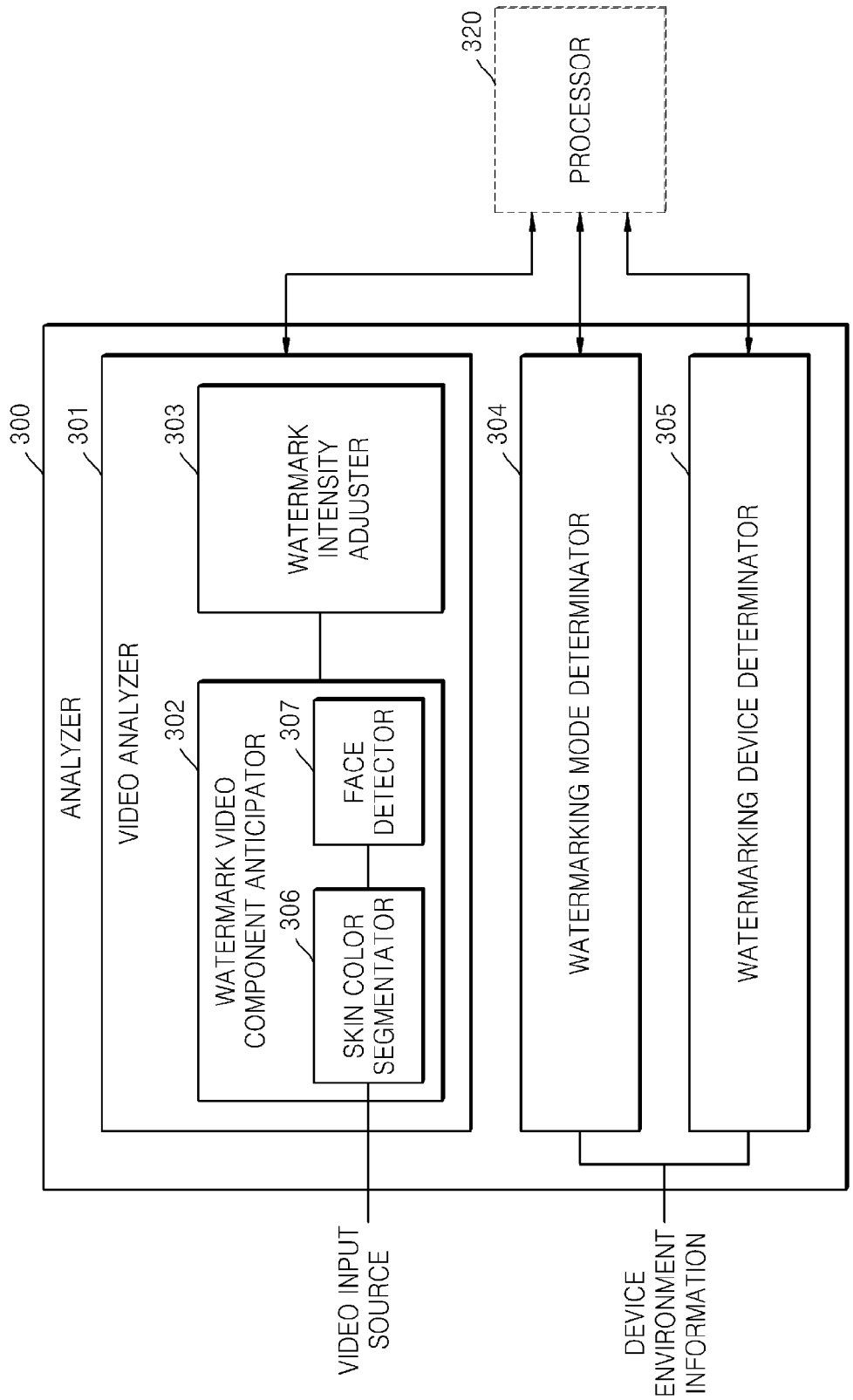
FIG. 4 is a detailed block diagram of a portion of FIG. 3.

FIG. 4 is a detailed block diagram of the analyzer 300 of FIG. 3. Referring to FIG. 4, the analyzer 300 includes a video analyzer 301, a watermarking mode determinator 304, and a watermarking device determinator 305.

The video analyzer 301 receives and analyzes the video contents during a video call. The video analyzer 301 includes a watermark video component anticipator 302 and a watermark intensity adjuster 303.

The watermark video component anticipator 302 anticipates a video component, in which a watermark is to be embedded, of the captured video contents during a video call.

A video input source received by the watermark video component anticipator 302 may be in any one of a variety of multimedia data formats, as for example, RealMedia, an MP3 file, an MP4 file, an MPEG file, but this is not limiting. A video input source may be an MPEG transmission stream signal or video data or multimedia data in a different format. The selection of transmission stream is not to limit an exemplary embodiment to the MPEG transmission stream, but to describe the technical characteristics of an exemplary embodiment. The MPEG transmission stream includes a group of pictures including an I frame, a B frame, and a P frame. The I frame is extracted and input to a skin color segmentator 306 that is described below.

The watermarked video component anticipator 302 includes the skin color segmentator 306 and a face detector 307. The skin color segmentator 306 segments an image based on a skin color to analyze video and generate a vector. The skin color segmentation is a process of distinguishing skin pixels and non-skin pixels in video contents. A first operation of the skin color segmentation is to select an appropriate color space. A red, green, and blue (RGB) color space and a hue, saturation, and value (HSV) color space are color spaces most frequently used for video tracking and monitoring. Different skin modeling techniques are used to model a distribution of the skin color pixels and the non-skin color pixels. The skin color segmentation is performed to reduce watermarking areas in the video contents.

The face detector 307 performs face detection to determine the position and size of a human face in the captured video contents. The face detection is performed by one of existing methods including sequential image/frame analysis, diamond/ellipse based analysis, etc. However, the face detection is not limited thereto and may be performed by using any method of the related art. An auto-focus feature built in a video camera may be used for efficient face detection. The face detection is performed to reduce an overhead of watermarking.

There may be a plurality of faces in a captured image of a video call. The faces in the captured video image are identified by performing the operations of the skin color segmentation and the face detection and a face in a video to be watermarked may be selected based on dominance and size of each face. A dominant face is determined among a plurality of faces in the captured video. The size of a dominant face is compared with other faces. When a difference in the size between the dominant face and the other faces is greater than a critical percentage, the dominant face is watermarked. Otherwise, the dominant face and the other faces are watermarked altogether.

The watermark intensity adjuster 303 adjusts the intensity of a blue color channel in each region of the segmented video contents. Since a human eye is less sensitive in detecting a change in the blue color channel, the blue color channel is selected among other color channels. The intensity of the blue color channel is adjusted so that a watermark to be applied is not seen in the video contents. A watermark channel intensity may be increased or decreased by the watermark intensity adjuster 303 based on the segmented face and skin regions.

The watermarking mode determinator 304 receives the network environment information and the environment information of the devices that are parties of a video call and identifies processing performance of devices and a network bandwidth of a channel. The processing performance of devices and a network bandwidth of a channel are identified to select a mode of watermarking to be performed. The mode of watermarking includes gray scale watermarking and pattern watermarking, but is not limited thereto. When at least one of the devices of a video call is a low-end processing device, gray scale watermarking is performed. When at least one of the devices of a video call is a high-end processing device, pattern watermarking is performed. The watermarking mode determinator 304 outputs to the processor 320 information about whether gray scale watermarking or pattern watermarking is to be performed based on a result of analysis.

The watermarking device determinator 305 receives the device environment information and the network environment information, determines in which one of the first device, the second device, and the service provider watermarking is to be performed, and outputs a result of the determination to the processor 320. In the present exemplary embodiment, watermarking may be performed on both of the first and second devices during a video call. When both of the first and second devices are incapable of watermarking and have no built-in watermarking characteristics, the watermarking is initiated by the service provider computer.

Figure 5:
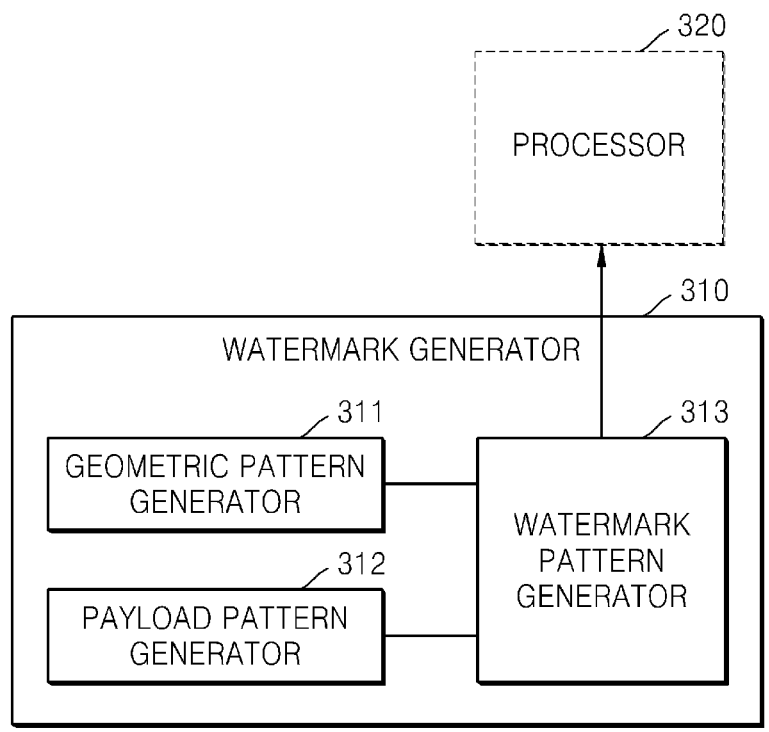
FIG. 5 is a detailed block diagram of a portion of FIG. 3.

FIG. 5 is a detailed block diagram of the watermark generator 310 of FIG. 3 that is used in a pattern watermarking mode. Referring to FIG. 5, the watermark generator 310 includes a geometric pattern generator 311, a payload pattern generator 312, and a watermark pattern generator 313.

Information to be embedded as a watermark is device information including unique identification details of a device. The unique identification details of a device include the IMEI number, a phone number, and channel 50 data, but are not limited thereto. The channel 50 data further includes local information of a mobile device.

The payload pattern generator 312 receives the unique identification details of a device and generates a payload pattern to embed a watermark. The geometric pattern generator 311 generates a geometric pattern to apply a watermark to a video signal. A payload pattern of the payload pattern generator 312 and a geometric pattern of the geometric pattern generator 311 are input to the watermark pattern generator 313.

The watermark pattern generator 313 generates a watermark pattern based on the payload pattern and the geometric pattern. The pattern watermark is applied to anticipated components of a video signal including skin, face, body parts, etc. of video contents.

The above pattern watermarking may be expressed by Equation 1 below.

$$p(x,y)=I(x,y)+\alpha \times w(x,y)$$ [Equation 1]

In Equation 1, p(x, y) denotes a watermark video, I(x, y) denotes an original video input, w(x, y) denotes a watermark pattern, and a denotes a scaling factor that is calculated by skin segmentation to hide the watermark.

Figure 7:
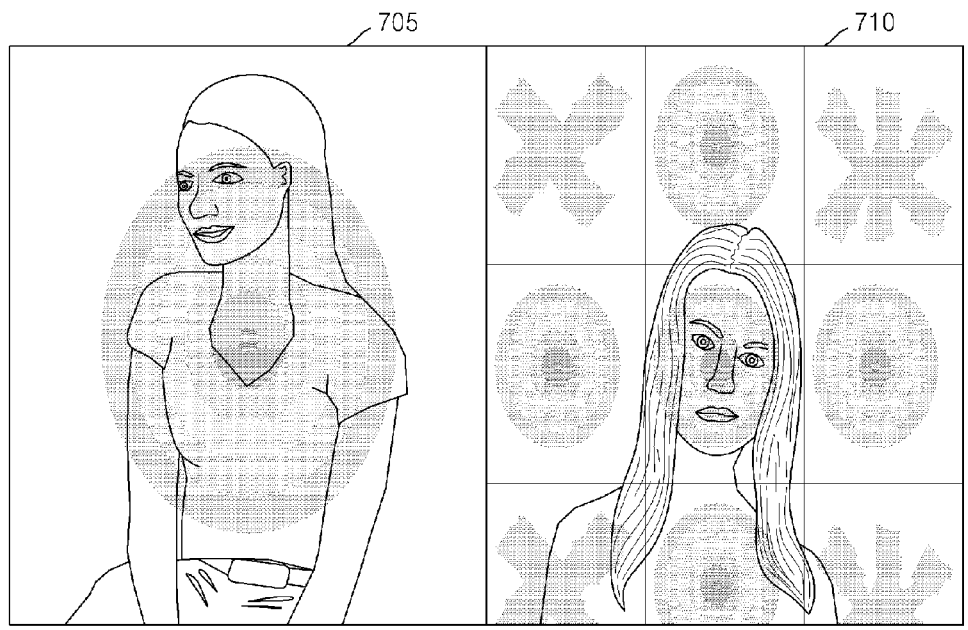
FIG. 7 illustrates a skin segment pattern and a block partition pattern, according to an exemplary embodiment.

FIG. 7 illustrates a skin segment pattern (reference numeral 705) and a block partition pattern (reference numeral 710) according to an exemplary embodiment. FIG. 7 illustrates a watermark to be applied to skin, face, and a body part of video contents. When face and skin segments are watermarked, overhead of watermarking is reduced and privacy and security for identity of a human is protected. The face detection may be efficiently performed in the low-end and high-end devices. A region 705 indicates a watermarked face area and a body area of a person. The face detection includes sequential image/frame analysis, diamond/ellipse based analysis, etc. However, the face detection is not limited thereto and may be performed by using any appropriate method. An auto-focus feature built in a video camera may be used for efficient face detection. A region 710 shows another method of applying a watermark to an identified face in an image.

Figure 8:
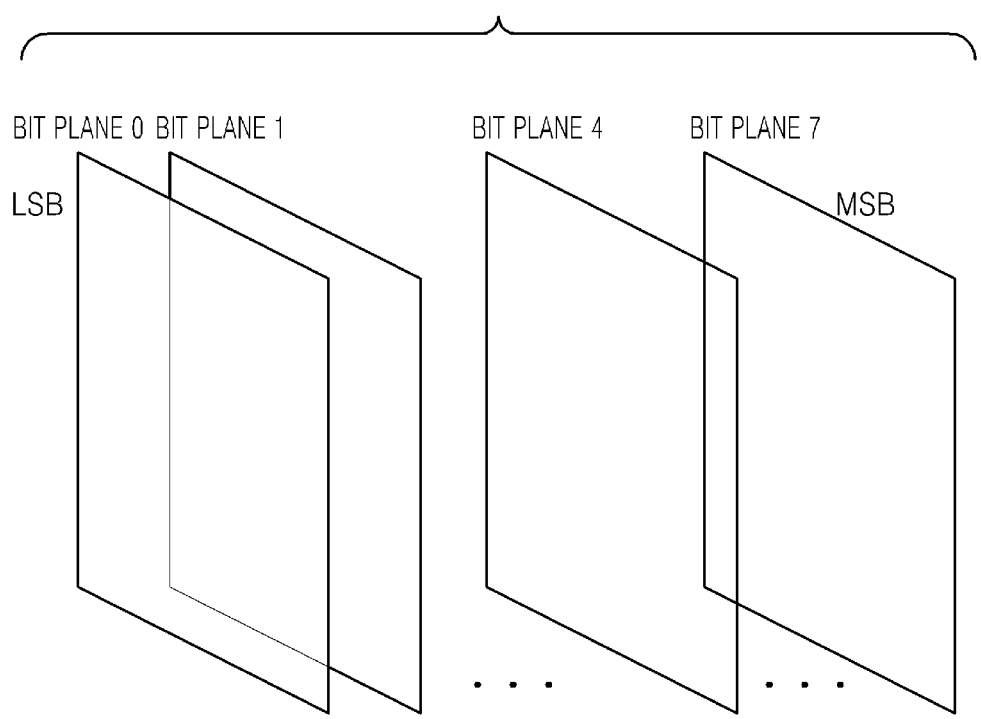
FIG. 8 illustrates an example of gray scale watermarking according to an exemplary embodiment.

FIG. 8 illustrates an example of the gray scale watermarking performed on a captured video call, according to an exemplary embodiment. The gray scale watermarking is applied to low-end processing mobile devices and/or when a network bandwidth is low. The gray scale watermarking uses amplitude modulation to watermark the captured video. A gray scale image is divided into a plurality of bit-plane layers in the captured video of a video call. In FIG. 8, the gray scale image is divided into eight bit-plane layers from bit-plane 0 to bit-plane 7. A mid-level bit-plane is identified from the bit-plane layers and watermark payload information is modulated in the mid-level bit-plane. A gray scale is basically black and white representation of frame and requires 1 Byte (8 Bits) to represent a pixel. A gray scale frame consists of 8 planes formed from each bit as shown in FIG. 8. If the Least Significant bit (LSB) plane is modulated, then watermark would be very weak and would thus be very difficult to detect at the time of analysis. If the Most Significant Bit (MSB) is modulated, then watermark would create too much noise in the watermarked frame, which obviously would not be acceptable as watermark is supposed to be invisible. So a tradeoff would suggest making the watermark modulation in the mid-level bit-plane which may be a plane formed by Bit 3 or Bit 4 as it would not create too much visible noise and would still be having a reasonable detection at the time of analysis.

An equation to embed a gray scale watermark may be expressed by Equation 2 below.

$$p(x,y)=I(x,y)+w(x,y)$$ [Equation 2]

In Equation 2, p(x, y) denotes watermarked video, I(x, y) denotes the original video, and w(x, y) denotes a watermark payload.

Figure 6:
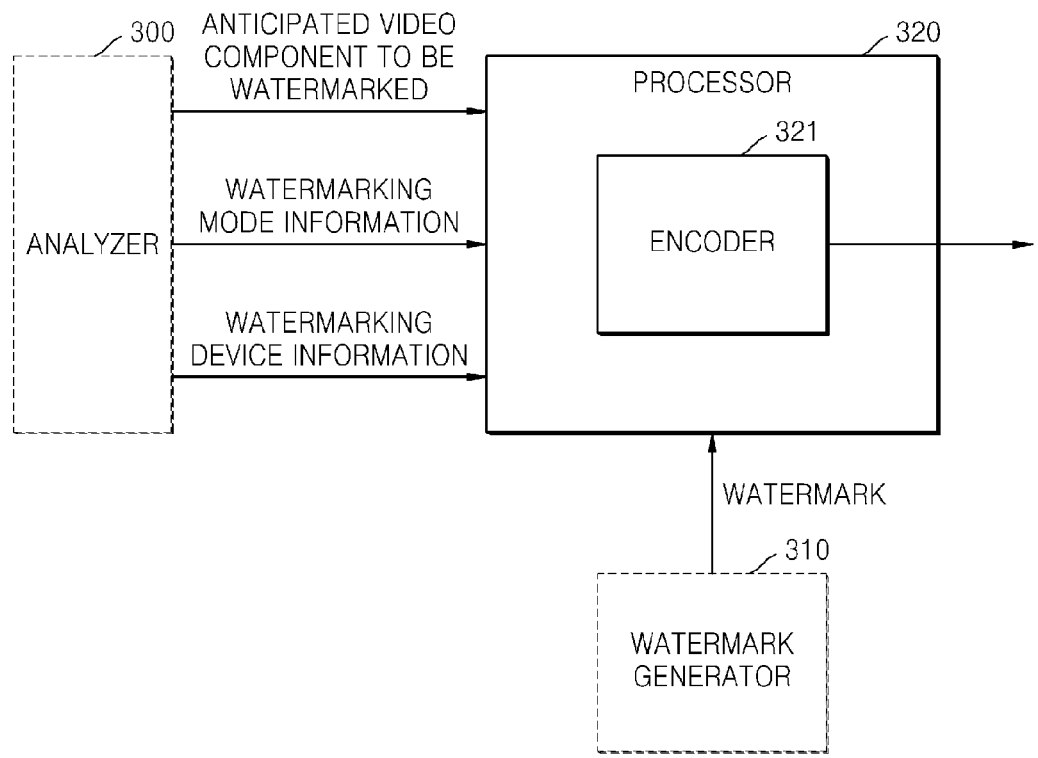
FIG. 6 is a detailed block diagram of a portion of FIG. 3.

FIG. 6 is a detailed block diagram of the processor 320 of FIG. 3. Referring to FIG. 6, the processor 320 includes an encoder 321. The processor 320 receives, from the analyzer 300, anticipated video contents to be watermarked, selected watermarking mode information, and watermarking device information, and receives a watermark payload from the watermark generator 310.

When the watermarking device information indicates that watermarking is performed in the first device, the encoder 321 embeds the watermark payload in the video contents by using the selected watermarking mode. The watermark payload is embedded in at least one of the skin, face, and body part areas identified from the video contents. When the pattern watermarking is determined to be performed, the watermark pattern provided by the watermark generator 310 of FIG. 5 is embedded in the video contents. When the gray scale watermarking is determined to be performed, the encoder 321 modulates the watermark payload and embeds a modulated watermark payload in a part of the bit planes divided as illustrated in FIG. 8.

When the watermarking device information shows that watermarking is performed in the other device of a video call, that is, the second device, or by the service provider, the watermarking is not performed in the first device and a message that the watermarking is to be performed in the second device or the service provider is output to the second device or the service provider.

Figure 9:
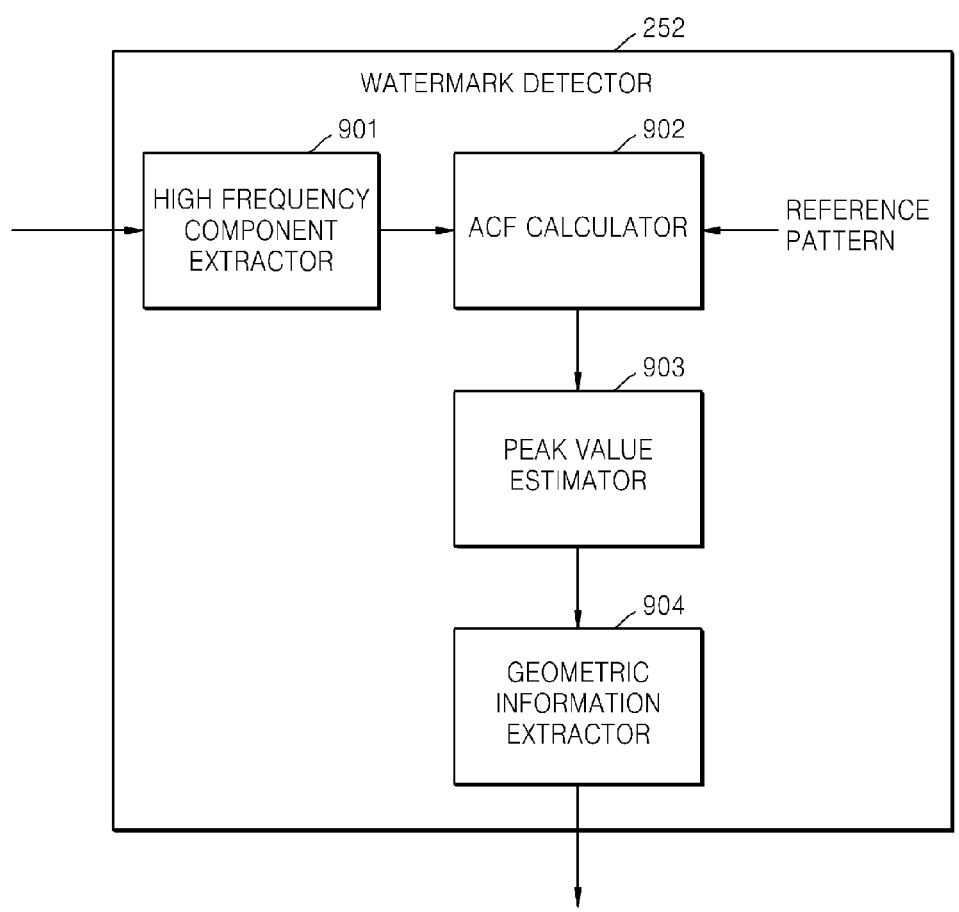
FIG. 9 illustrates an example of a portion of FIG. 2.

FIG. 9 illustrates an example of the watermark detector 252 of FIG. 2. The watermark detector 252 detects the watermark pattern embedded in the video contents. For instance, the watermark detection is performed when a person takes a snapshot or records a video call without authorization of an initiator of the video call. When a video call is initiated from the first device to the second device, there is a possibility for a person to record video contents at the second device by using a camera. When the video contents are watermarked with an invisible watermark before being transmitted by the first device, an illegal user of the video contents may be tracked. Tracking of an illegal user who records the video contents on the second device may be performed by detecting the invisible watermark in a copy of the recorded video contents.

Referring to FIG. 9, the watermark detector 252 includes a high frequency component extractor 901, an auto correlation function (ACF) calculator 902, a peak value estimator 903, and a geometric information extractor 904.

The high frequency component extractor 901 receives watermarked data and extracts a high frequency component from the received data. The high frequency component is used as an estimate value of the watermark payload embedded in the original video contents.

The estimate watermark payload may be expressed by Equation 3 below.

$$w(x,y)=p(x,y)-p'(x,y) \quad \text{[Equation 3]}$$

In Equation 3, $w(x, y)$ denotes an estimated watermark payload, $p(x, y)$ denotes a received signal, and $p'(x, y)$ denotes an estimated original signal.

The ACF calculator 902 calculates an auto correlation function of the extracted watermark. ACF of a signal may be expressed in the form of convolution of a signal and a geometric inverse thereof. Accordingly, fast Fourier transform (FFT) and inverse FFT may be used for calculation of ACF to reduce time. An estimate value of the watermark payload received from the high frequency component extractor 901 through the calculation of ACF as described above is matched with a stored reference pattern. The reference pattern is generated with the same unique identification details used in the embedding procedure. The unique identification details include the IMEI number, a phone number, and channel 50 data, but are not limited thereto. The channel 50 data includes local information of a mobile device.

The peak value estimator 903 detects a peak value of a correlation value received from the ACF calculator 902. Among the correlation values, a correlation value over a predetermined critical value is used as a match and is used to extract geometric pattern.

The geometric information extractor 904 receives a correlation value received from the peak value estimator 903 and exceeding a predetermined critical value and extracts a geometric pattern to compensate for geometric distortion including translation, rotation, misalignment, scaling, cropping, and tilt. However, the geometric distortion is not limited thereto. An extracted geometric pattern is used for the compensation of the geometric distortion in an estimated watermark signal. An extracted payload pattern is compared with a payload pattern stored to identify contents of a payload of video.

Figure 10:
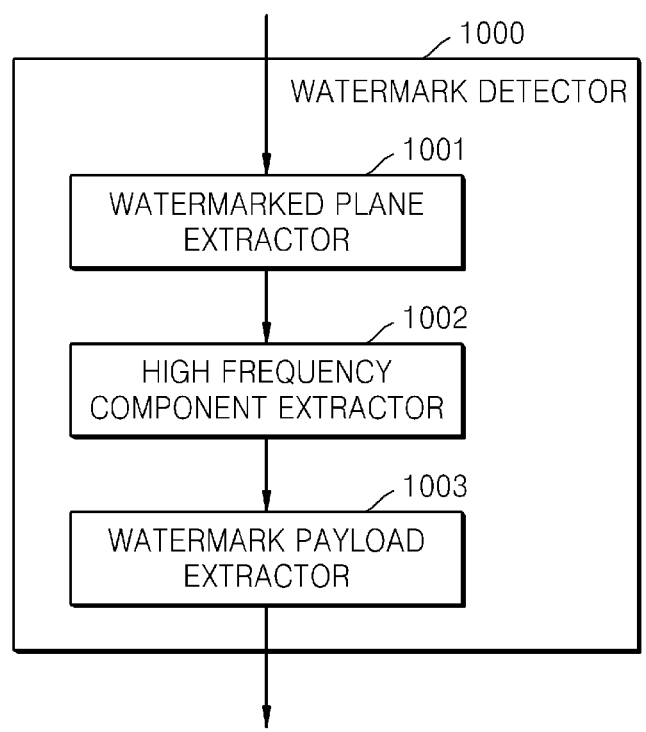
FIG. 10 illustrates an example of a portion of FIG. 2.

FIG. 10 illustrates a watermark detector 1000 for detecting a watermark according to the gray scale watermarking. Referring to FIG. 10, the watermark detector 1000 includes a watermarked plane extractor 1001, a high frequency component extractor 1002, and a watermark payload extractor 1003. In the gray scale watermarking, a watermark payload is directly embedded into a mid-bit plane of a video signal.

The watermarked plane extractor 1001 extracts a mid-bit plane of video that is watermarked. The watermarked plane is known to a receiver.

The high frequency component extractor 1002 extracts a high frequency component from the watermarked plane or the mid-bit plane identified by the watermarked plane extractor 1001. The high frequency component of video includes a watermarked signal embedded in the original video. The watermark payload extractor 1003 extracts a watermark payload from the high frequency component of a video signal. Unique details embedded in the watermark are identified by comparing the watermark payload with a stored pattern.

Figure 11:
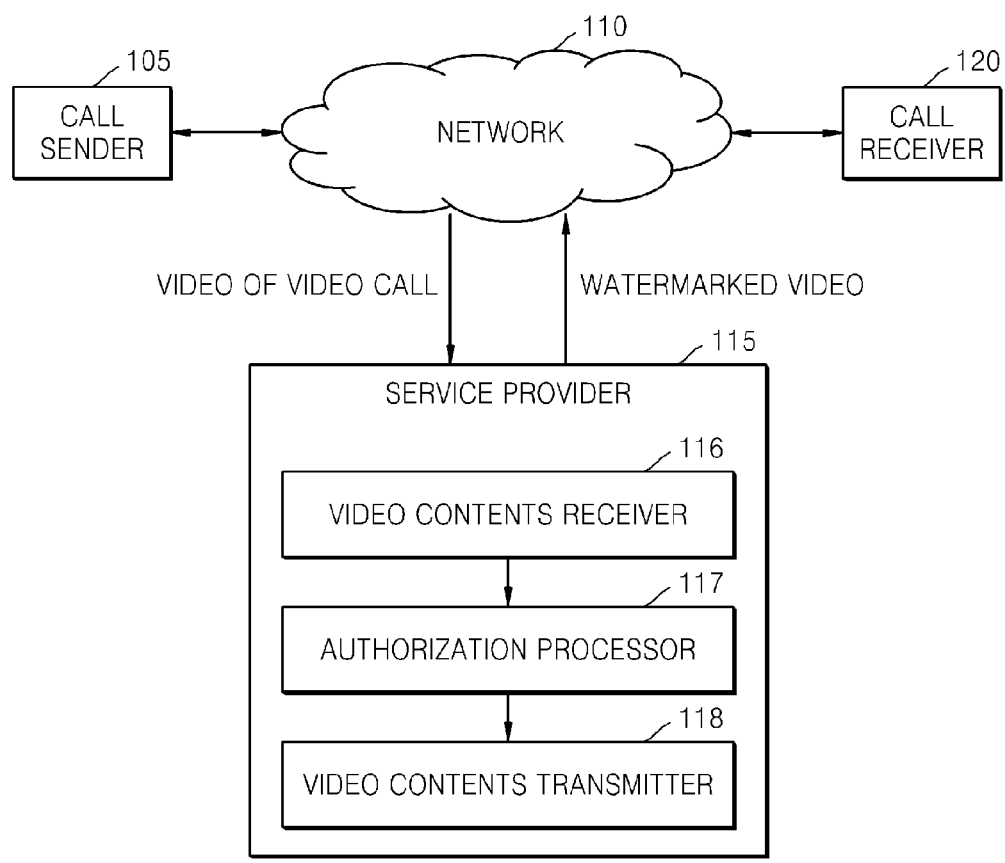
FIG. 11 illustrates an example of a watermark processing system of a service provider.

FIG. 11 illustrates an example of authorization of a video call in a service provider, according to an exemplary embodiment. For example, when it is difficult to process watermarking in a call sender or a call receiver due to a device environment or a network environment, the call sender notifies the service provider about the difficulty so that the authorization of a video call may be performed in the service provider.

When the call sender 105 initiates a video call to a call receiver 120 via the network 110, the service provider 115 captures an initiated video call, processes a watermark on video contents that are transmitted from the call sender 105 to the call receiver 120, and transmits processed video contents to the call receiver 120.

Referring to FIG. 11, the service provider 115 includes a video contents receiver 116, an authorization processor 117, and a video contents transmitter 118. For example, the service provider 115 may include a service providing computer and all or some of the video contents receiver 116, the authorization processor 117, and the video contents transmitter 118 may be embodied in the service providing computer.

The video contents receiver 116 receives captured video contents of a video call initiated by the call sender 105 to the call receiver 120. The authorization processor 117 embeds a watermark in the captured video contents. The same structure as the authorization processor 250 as illustrated in FIG. 2 may be used for the embedding of a watermark. The video contents transmitter 118 transmits to the call receiver 120 the video contents in which a watermark is embedded.

Figure 12:
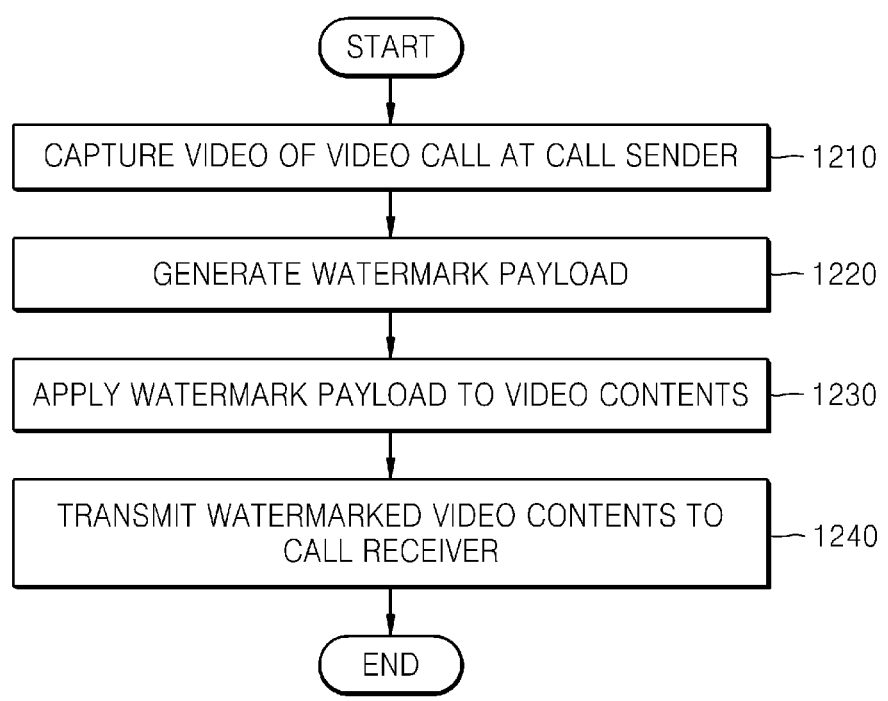
FIG. 12 is a flowchart of a method of authorizing video contents of a video call at a call sender, according to an exemplary embodiment.

FIG. 12 is a flowchart for explaining an example of a method of authorizing video contents of a video call at a call sender, according to an exemplary embodiment. A video call is initiated by a call sender to a call receiver via a service provider. The call sender initiates watermarking at at least one of the call sender and the call receiver based on processing performance and a network bandwidth.

In operation 1210, when the call sender initiates a video call to the call receiver via the service provider, an image obtainer, i.e., a camera, of the call sender begins capturing video contents of the video call. The watermarking is performed with respect to the video call that is captured in real time.

In operation 1220, the watermark generator 310 of the watermark embedder 251 generates a watermark payload to be embedded in the captured video. The watermark generator 310 may use unique identification details of a device to generate a watermark payload, as described above.

In operation 1230, the watermark payload is applied to the video contents. To apply the watermark payload to the video contents, a component of the video contents where a watermark is to be embedded is anticipated. To this end, the skin color segmentator 306 of the analyzer 300 performs skin color segmentation of a captured video call, as described above. To model a distribution of skin color pixels and non-skin color pixels, different skin modeling techniques may be performed. Skin segmentation is performed to reduce areas for watermarking in a video.

The face detector 307 performs detection of a face to determine the position and size of a human face in the captured video, as described above.

The face detector 307 also identifies a face from the captured video that is to be watermarked, as described above.

The watermarking mode determinator 304 analyzes the device environment and the network environment for applying a watermark payload to the video contents and determines a watermarking mode to apply. The processing performance of a device may be considered as the device environment and a network bandwidth may be considered as the network environment. However, an exemplary embodiment is not limited thereto.

The watermarking device determinator 305 determines on which of the call sender, the call receiver, and the service provider the watermarking is to be performed in consideration of the processing performance of a device and the network bandwidth. When it is determined that watermarking is performed on the call receiver or the service provider, a notification is transmitted to the service provider or the call receiver.

Then, the processor 320 performs watermarking by embedding a watermark payload in the captured video signal. The watermarking mode to apply is selected based on the device processing performance and the network bandwidth, as described above. When the call sender is a high-end processing device, the pattern watermarking is applied by the structure as illustrated in FIG. 5. When the call sender is a low-end processing device, the gray scale watermarking is applied by using the structure as illustrated in FIG. 8.

In operation 1240, the communicator 230 transmits generated watermarked video contents to the call receiver through the service provider.

Figure 13:
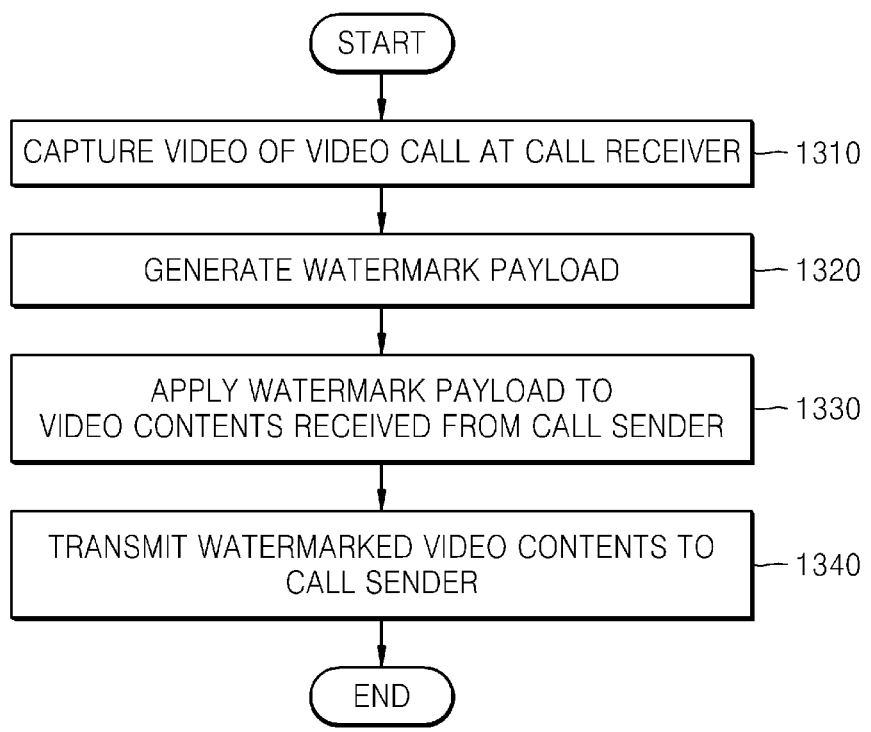
FIG. 13 is a flowchart of a method of authorizing video contents of a video call at a call receiver, according to an exemplary embodiment.

FIG. 13 is a flowchart for explaining an example of a method of authorizing video contents of a video call at a call receiver, according to an exemplary embodiment. A call sender initiates a video call to a call receiver via a service provider. When the video call is initiated, an image obtainer, i.e., a camera, of the call receiver begins capturing video and the watermarking is performed on the video captured by the call receiver.

In operation 1310, the call receiver captures via the network the video call initiated by the call sender.

In operation 1320, the watermark generator 310 generates a watermark payload to be embedded in the captured video. The watermark generator 310 may use unique identification details of a mobile device to generate a watermark payload. The unique identification details include the IMEI number, a phone number, and channel 50 data, but are not limited thereto. The channel 50 data includes local information of a mobile device.

In operation 1330, a watermark payload is applied to the video contents received from the call sender. To apply the watermark payload to the video contents, the skin color segmentator 306 of the analyzer 300 performs skin color segmentation of the captured video call, as described above.

The face detector 307 performs detection of a face to determine the position and size of a human face in the captured video, as described above.

The face detector 307 identifies a face from the captured video that is to be watermarked, as described above.

The processor 320 performs watermarking by embedding a watermark payload in the captured video signal.

In operation 1340, the communicator 230 transmits generated watermarked video contents to the call sender via the service provider.

In an exemplary embodiment, any one of the call sending device and the call receiving device is notified about a certain change in the setting of a watermarking application. For example, when watermarking at the call receiving device is disabled, such a result is notified to the call sending device. Likewise, when watermarking at the call sending device is disabled, such a result is notified to the call receiving device. Also, a party using the device may determine whether to continue to conduct the video call. This provides efficient and tight security with respect to the watermarking method.

Figure 14:
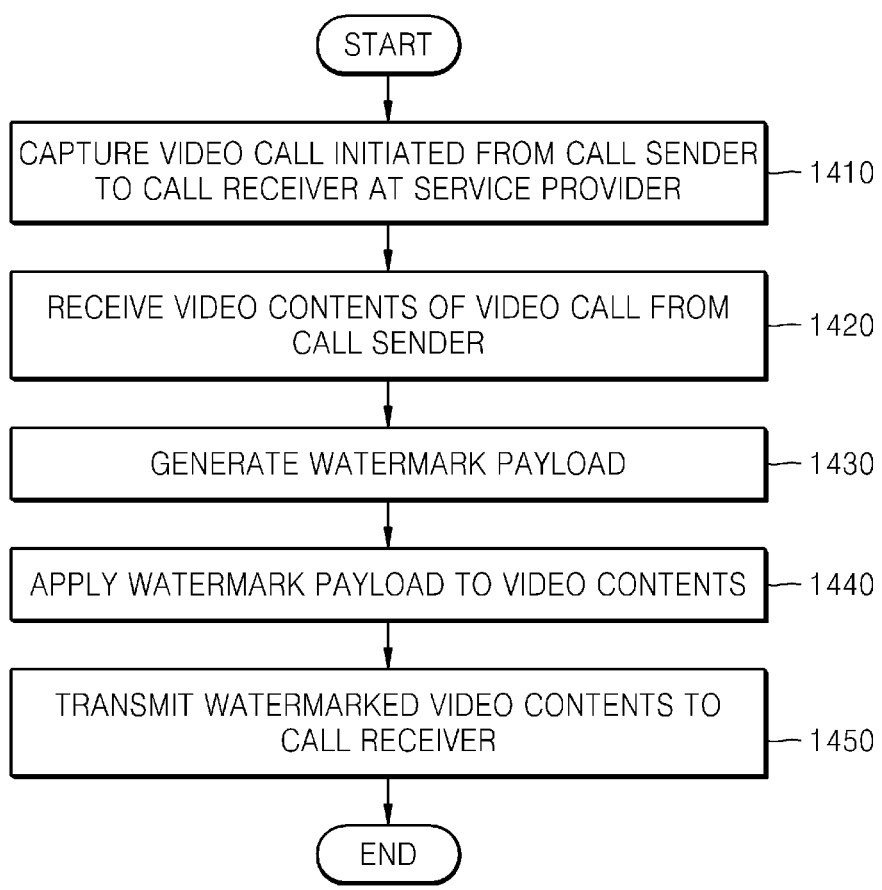
FIG. 14 is a flowchart of a method of authorizing video contents of a video call at a service provider, according to an exemplary embodiment.

FIG. 14 is a flowchart for explaining an example of a process of watermarking a video call captured by the service provider during the video call between the call sender and the call receiver. Referring to FIG. 14, in operation 1410, the service provider captures a video call initiated by the call sender to the call receiver via the network. In operation 1420, the video contents receiver 116 receives video contents during the video call from the call sender. In operation 1430, the authorization processor 117 generates a watermark payload to be embedded in the video contents. In operation 1440, the authorization processor 117 applies the generated watermark payload to the video contents of the video call. In operation 1450, the video contents transmitter 118 transmits the watermarked video contents to the call sender.

Figure 15:
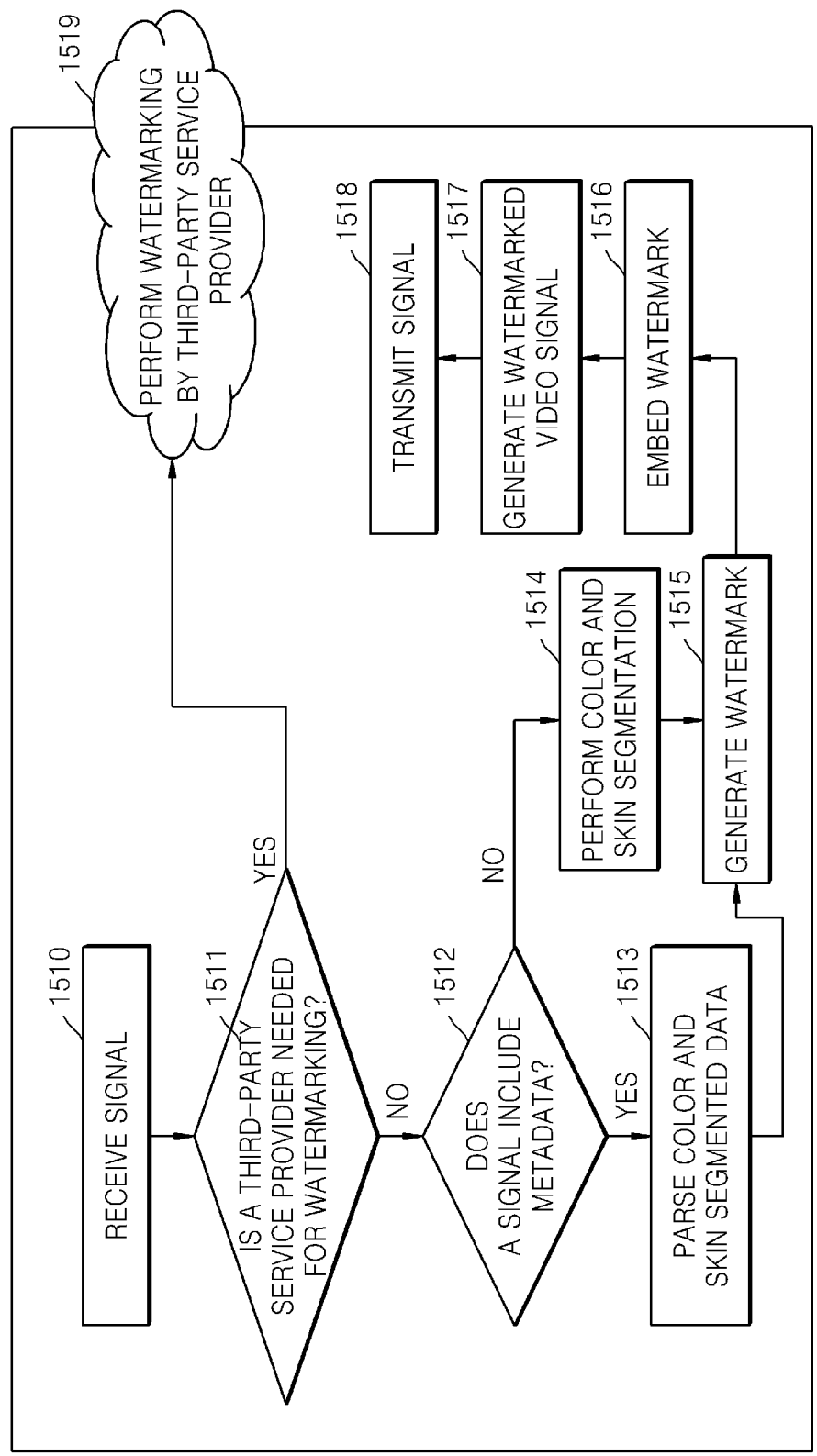
FIG. 15 is a flowchart of a method of authorizing video contents of a video call at a service provider, according to an exemplary embodiment.

FIG. 15 is a flowchart for explaining another example of a process of performing watermarking at the service provider. When the processing performance measure of at least one of the call sender and call receiver are lower than a predetermined value or when the network bandwidth is low, watermarking may be performed at the service provider.

In operation 1510, the service provider receives a signal from at least one of the call sender and the call receiver. The received signal includes at least one of the captured video of a video call, the unique identification details to be watermarked, and metadata of the captured video. After identifying the device processing performance, one of the call sender and the call receiver may determine whether the watermarking is to be performed by the call sender or the call receiver or by the service provider. When the device processing performance is insufficient for watermarking, the captured video call is transmitted to the service provider.

In operation 1511, performance of the service provider is determined to check whether a third-party service provider is needed for watermarking. The service provider that is used by the call sender to communicate with the third-party service provider may not support a watermarking characteristic. In such a case, in operation 1519, the third-party service provider is involved to perform watermarking of a video signal. The third-party service provider receives from the service provider information including the captured video, the unique identification details to be watermarked in the captured video, and metadata of the captured video. However, the information is not limited thereto. When the metadata of the captured video is not available, the third-party service provider performs the operations of skin segmentation and face detection to identify the video contents to be watermarked. The third-party service provider embeds a watermark in the captured video. As the third-party service provider provides a watermarking service, it may earn income from providing the watermarking service. When the service provider is capable of watermarking, operation 1512 is performed.

In the operation 1512, the signal received from the device is analyzed to see if the signal contains the metadata of the captured video. The metadata of the captured video is generated by pre-processing of the video. The metadata of the captured video may be used by the service provider to apply a watermark to the video. The metadata of the captured video includes information related to a video component, including details of an object of video, details of skin color segmentation, details of face detection, and other color information, but the information is not limited thereto. When the received signal is analyzed and the metadata of the received signal is identified, operation 1513 is performed. When the metadata of the captured video is not identified from the received signal, operation 1514 is performed.

In the operation 1513, data that is color and skin segmented is collected from the metadata and parsed. Components of the captured video to be watermarked are identified from the skin segmented data. The selected components and watermarking to be processed on a face reduce overhead of watermarking.

In operation 1514, a video signal is analyzed to anticipate the components of video to be watermarked. In an exemplary embodiment, the analysis of video is performed by extracting I frames of the captured video. I frame indicates an intra-coded frame in a group of pictures. The skin color segmentation is performed on I frames to identify skin areas of the captured video. Contents of the captured video to be watermarked may be anticipated from details of skin segmentation and face detection.

In operation 1515, the watermark payload is generated from the unique identification details of devices. The unique identification details include the IMEI number, a phone number, and channel 50 data, but are not limited thereto. The channel 50 data includes local information of a mobile device. The information to be watermarked is identified and the watermark payload is generated.

In operation 1516, the watermark is embedded in the video. The generated watermark payload and the anticipated components of the captured video are used to embed the watermark in the video. The watermark is embedded by applying at least one of gray scale watermarking and pattern watermarking. When the network bandwidth is low, the gray scale watermarking is applied. When the processing performance and the network bandwidth are high, the pattern watermarking is applied.

In operation 1517, watermarked video contents are generated. In operation 1518, a generated signal is transmitted to the call sender and the call receiver.

Figure 16:
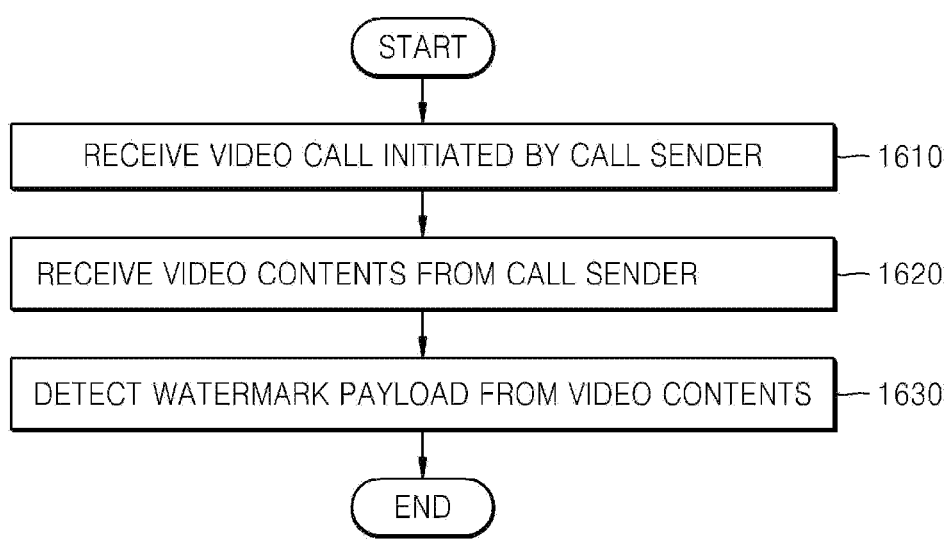
FIG. 16 is a flowchart of a method of detecting a watermark embedded in video contents of a video call, according to an exemplary embodiment.

FIG. 16 is a flowchart for explaining an example of a process of detecting a watermark embedded in video contents of a video call. Referring to FIG. 16, in operation 1610, a video call initiated by the call receiver is received via the network. In operation 1620, video contents are received from the call receiver. In operation 1630, a watermark payload is detected from the video contents.

When a watermark is embedded by the pattern watermarking, a high frequency component is extracted from received watermarked data. The high frequency component includes the watermark payload that is embedded in the original video contents. Once the high frequency component is extracted, the watermark payload may be estimated. In detail, as described above with reference to FIG. 9, a watermark may be extracted by the operation of the watermark detector 252.

When the watermark is embedded by the gray scale watermarking, the watermark payload is directly embedded in the mid-bit plane of a video signal. Accordingly, in this case, the mid-bit plane that is a watermarked plane of video is extracted. A high frequency signal is extracted from the identified watermarked plane or mid-bit plane. The high frequency component of video includes the watermarked signal that is embedded in the original video. The watermark payload is extracted from the high frequency component of a video signal. The unique identification details that are embedded in the watermark are identified by comparing the watermark payload with a stored pattern.

The exemplary embodiments described above provide efficient and tight security to video contents of a video call. This system provides a method of analyzing and adapting current performance according to an environment. Intelligence of the system enables a watermarking method and identification of device processing performance and a network bandwidth between parties involved in communication for automatic switching between watermarking positions including a source, a destination, or a service provider, but is not limited thereto. The system provides effective bandwidth use. The method includes selective skin segmentation and face detection that reduce the overhead of watermarking.

Also, the system provides an effective method of tracking an illegal user who takes a snapshot of or records a video call without authorization of an initiator of the video call.

Exemplary embodiments can also be implemented through computer readable code/instructions in/on a medium, e.g., a computer-readable recording medium, to control at least one processing element to implement any of above-described exemplary embodiments. The recording medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

The foregoing exemplary embodiments and advantages are merely exemplary and are not to be construed as limiting. The present teaching can be readily applied to other types of apparatuses. The description of the exemplary embodiments is intended to be illustrative, and not to limit the scope of the claims, and many alternatives, modifications, and variations will be apparent to those skilled in the art.

What is claimed is:

1. A method of authorizing video contents during a video call by a first device, the method comprising:
   initiating the video call between the first device and a second device, the video call being transmitted from the first device to the second device via a network;
capturing the video contents related to the video call, the video contents comprising a plurality of frames;
generating a watermark to include device information about at least one among the first device and the second device;
embedding the watermark into the plurality of frames included in the video contents related to the video call; and
transmitting watermarked video contents to the second device,
wherein the generating the watermark comprises:
determining a processing performance measure of the at least one among the first device and the second device,
applying a gray scale watermarking to the watermark, in response to determining of:
the processing performance measure of the at least one among the first device and the second device is lower than a predetermined value of the processing performance measure, or
a network bandwidth is lower than a certain value; and
applying a pattern watermarking to the watermark, in response to the determining of:
the processing performance measure of the at least one among the first device and the second device is equal to or higher than the predetermined value of the processing performance measure, or
the network bandwidth is equal to or higher than the certain value.

2. The method of claim 1, wherein the capturing the video contents related to the video call is performed in real time.

3. The method of claim 1, wherein the device information comprises at least one among an International Mobile Station Equipment Identity (IMEI) number, a phone number, and channel 50 data, and
the channel 50 data includes local information of a mobile device.

4. The method of claim 1, wherein, when watermarking is disabled at the first device, the method further comprises notifying the second device of a disablement of the watermarking at the first device.

5. The method of claim 1, wherein, when the processing performance measure of the first device is less than a threshold value for watermarking, the method further comprises notifying the second device or a service provider for the video call to allow the watermarking to be performed at the second device or at the service provider.

6. The method of claim 1, wherein the embedding the watermark comprises:
generating a vector by performing at least one among skin segmentation and face detection to identify components of the video contents to be watermarked.

7. A method of authorizing video contents during a video call at a second device, the method comprising:
receiving, at the second device, the video call between a first device and the second device;
capturing the video contents related to the video call, the video contents comprising a plurality of frames;
generating a watermark to include device information about at least one among the first device and the second device;
embedding the watermark into the plurality of frames included in the video contents related to the video call; and
transmitting watermarked video contents to the first device which initiates the video call,
wherein the generating the watermark comprises:
determining a processing performance measure of the at least one among the first device and the second device;
applying a gray scale watermarking to the watermark, in response to determining of:
the processing performance measure of the at least one among the first device and the second device is lower than a predetermined value of the processing performance measure, or
a network bandwidth is lower than a certain value; and
applying a pattern watermarking to the watermark, in response to the determining of:
the processing performance measure of the at least one among the first device and the second device is equal to or higher than the predetermined value of the processing performance measure, or
the network bandwidth is equal to or higher than the certain value.

8. A method of authorizing video contents of a video call at a service provider, the method comprising:
receiving the video call between a first device and a second device, from the first device;
capturing the video contents related to the video call, the video contents comprising a plurality of frames;
generating a watermark to include device information about at least one among the first device and the second device;
embedding the watermark into the plurality of frames included in the video contents related to the video call; and
transmitting watermarked video contents to the second device,
wherein the generating the watermark comprises:
determining a processing performance measure of the at least one among the first device and the second device;
applying a gray scale watermarking to the watermark, in response to determining at least one of:
the processing performance measure of the at least one among the first device and the second device is lower than a predetermined value of the processing performance measure, or
a network bandwidth is lower than a certain value; and
applying a pattern watermarking to the watermark, in response to the determining of:
the processing performance measure of the at least one among the first device and the second device is equal to or higher than the predetermined value of the processing performance measure, or
the network bandwidth is equal to or higher than the certain value.

9. A method of authorizing video contents at a second device, the method comprising:
receiving, at the second device, a video call initiated by a first device;
receiving the video contents of the video call initiated by the first device via a network, the video contents comprising a watermark generated to include device information about at least one among the first device and the second device and embedded into at least one frame among a plurality of frames included in the video contents related to the video call; and
detecting the watermark from the video contents,
wherein a type of the watermarking applied to the watermark is a gray scale watermarking which is selected in response to determining of:

a processing performance measure of the at least one among the first device and the second device is lower than a predetermined value of the processing performance measure, or a network bandwidth is lower than a certain value; and wherein the type of the watermarking applied to the watermark is a pattern watermarking which is selected in response to determining of:

the processing performance measure of the at least one among the first device and the second device is equal to or higher than the predetermined value of the processing performance measure, or the network bandwidth is equal to or higher than the certain value.

10. A device for authorizing video contents during a video call, the device comprising:

a camera configured to capture the video contents related to the video call between the device and another device, the video contents comprising a plurality of frames;

a microprocessor configured to:

generate a watermark to include device information about at least one among the device and the another device;

embed the watermark into the plurality of frames included in the video contents related to the video call; and a transmitter configured to transmit watermarked video contents to the another device, wherein the microprocessor is further configured to:

determine a processing performance measure of the at least one among the device and the another device;

apply a gray scale watermarking to the watermark, in response to determining of:

the processing performance measure of the at least one among the device and the another device is lower than a predetermined value of the processing performance measure, or a network bandwidth is low lower than a certain value; and apply a pattern watermarking to the watermark, in response to the determining of:

the processing performance measure of the at least one among the device and the another device is equal to or higher than the predetermined value of the processing performance measure, or the network bandwidth is equal to or higher than the certain value.

11. The device of claim 10, wherein the capturing the video contents related to the video call is performed in real time.

12. A service provider for authorizing video contents during a video call, the service provider comprising:

a video contents receiver configured to receive the video call between a first device and a second device and to capture the video contents related to the video call, the video contents comprising a plurality of frames;

an authorization processor configured to generate a watermark to include device information about at least one among the first device and the second device, and embed the generated watermark into the plurality of frames included in the video contents related to the video call; and a video contents transmitter configured to transmit watermarked video contents to at least one among the first device and the second device, wherein the authorization processor is further configured to:

determine a processing performance measure of the at least one among the first device and the second device;

apply a gray scale watermarking to the watermark, in response to determining of:

the processing performance measure of the at least one among the first device and the second device is lower than a predetermined value of the processing performance measure, or a network bandwidth is lower than a certain value; and apply a pattern watermarking to the watermark, in response to the determining of:

the processing performance measure of the at least one among the first device and the second device is equal to or higher than the predetermined value of the processing performance measure, or the network bandwidth is equal to or higher than the certain value.

13. A device for authorizing video contents of a video call, the device comprising:

a microprocessor which is coupled to a communicator and a watermark detector and configured to:

control the communicator to receive the video call between the device and another device and the video contents of the video call, comprising a plurality of frames, the video contents comprising a watermark which includes device information about at least one among the device and the another device, and control the watermark detector to detect the watermark from the video contents which have been captured from the video call, wherein a type of the watermarking applied to the watermark is a gray scale watermarking which is selected in response to determining at least one of:

a processing performance measure of the at least one among the device and the another device is lower than a predetermined value of the processing performance measure, or a network bandwidth is lower than a certain value; and wherein the type of the watermarking applied to the watermark is a pattern watermarking which is selected, in response to the determining of:

the processing performance measure of the at least one among the device and the another device is equal to or higher than the predetermined value of the processing performance measure, or the network bandwidth is equal to or higher than the certain value.

14. A non-transitory computer-readable recording medium having recorded thereon a program which, when executed by a computer, causes the computer to execute a method of authorizing video contents during a video call, the method comprising:

receiving the video call between a first device and a second device, from the first device;

capturing the video contents related to the video call, the video contents comprising a plurality of frames;

generating a watermark to include device information about at least one among the first device and the second device;

embedding the watermark into the plurality of frames included in the video contents related to the video call; and transmitting watermarked video contents to the second device, wherein the generating the watermark comprises:

determining a processing performance measure of the at least one among the first device and the second device;

applying a gray scale watermarking to the watermark, in response to determining of:

the processing performance measure of the at least one among the first device and the second device is lower than a predetermined value of the processing performance measure, or a network bandwidth is lower than a certain value; and applying a pattern watermarking to the watermark, in response to the determining of:

the processing performance measure of the at least one among the first device and the second device is equal to or higher than the predetermined value of the processing performance measure, or the network bandwidth is equal to or higher than the certain value.

15. The method of claim 1, wherein the applying the gray scale watermarking comprises applying the gray scale watermarking as an amplitude modulation in a mid-level bit plane of a grayscale frame, and the applying the pattern watermarking comprises generating the watermark to comprise a geometric pattern in response to at least one among the first device and the second device being a high-end processing device of which the processing performance is higher than the predetermined value.

16. The method of claim 15, wherein the mid-level bit plane is disposed between a low-level bit plane and a high-level bit plane of the grayscale frame.

* * * * *